United States Patent
Deparis et al.

(10) Patent No.: US 11,047,300 B2
(45) Date of Patent: Jun. 29, 2021

(54) PYLON OF A PROPULSION UNIT

(71) Applicant: SAFRAN AIRCRAFT ENGINES, Paris (FR)

(72) Inventors: Hélène Madeleine Nicole Deparis, Paris (FR); Pierre Grégoire Anton, Brie-Comte-Robert (FR); Pradeep Cojande, Epinay sur Orge (FR); Ghislain Maxime Romuald Madiot, Draveil (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 414 days.

(21) Appl. No.: 16/198,530

(22) Filed: Nov. 21, 2018

(65) Prior Publication Data

US 2019/0153940 A1    May 23, 2019

(30) Foreign Application Priority Data

Nov. 22, 2017  (FR) ...................................... 1761076

(51) Int. Cl.
| | |
|---|---|
| *B64D 29/06* | (2006.01) |
| *F02C 3/06* | (2006.01) |
| *F02C 7/042* | (2006.01) |
| *F02C 9/18* | (2006.01) |
| *B64D 27/26* | (2006.01) |
| *F04D 29/54* | (2006.01) |

(Continued)

(52) U.S. Cl.
CPC ................ *F02C 3/06* (2013.01); *B64D 27/26* (2013.01); *B64D 29/06* (2013.01); *F01D 9/041* (2013.01); *F01D 9/065* (2013.01); *F01D 25/162* (2013.01); *F01D 25/24* (2013.01); *F02C 7/042* (2013.01); *F02C 9/18* (2013.01); *F02K 3/06* (2013.01); *F04D 29/544* (2013.01); *B64D 2027/262* (2013.01); *F05D 2220/323* (2013.01); *F05D 2220/36* (2013.01); *F05D 2240/12* (2013.01); *F05D 2240/90* (2013.01)

(58) Field of Classification Search
CPC .. B64D 2027/262; B64D 27/26; B64D 29/06; F02C 3/06; F02C 7/042; F04D 29/544; F05D 2240/90
USPC .......................................................... 244/54
See application file for complete search history.

(56) References Cited

FOREIGN PATENT DOCUMENTS

| EP | 2378072 A2 | 10/2011 |
|---|---|---|
| FR | 3032480 A1 | 8/2016 |

(Continued)

OTHER PUBLICATIONS

French Search Report dated Jul. 13, 2018, issued in correspondence French Application No. 1761076, filed Nov. 22, 2017, 7 pages.

*Primary Examiner* — Claude J Brown
(74) *Attorney, Agent, or Firm* — Christensen O'Connor Johnson Kindness PLLC

(57) ABSTRACT

A disclosed propulsion unit includes a pylon having a blade presenting a chord Cx and a downstream arm having a structural arm. The pylon has a first distance D between a trailing edge of a fan blade and a leading edge of the fan blade, a second distance d between said trailing edge of the blade and a leading edge of the structural arm, and a third distance L between the trailing edge of the blade and a mark located at a maximum thickness of the downstream arm. The pylon is dimensioned according to: a first quotient between D and Cx between 2.2 and 2.6, a second quotient between d and Cx between 1 and 1.2, and a third quotient between L and Cx between 4 and 7.

11 Claims, 3 Drawing Sheets

(51) Int. Cl.
*F01D 9/06* (2006.01)
*F02K 3/06* (2006.01)
*F01D 9/04* (2006.01)
*F01D 25/24* (2006.01)
*F01D 25/16* (2006.01)

(56) References Cited

FOREIGN PATENT DOCUMENTS

| | | | |
|---|---|---|---|
| FR | 3032495 | A1 | 8/2016 |
| FR | 3039598 | A1 | 2/2017 |

PYLON OF A PROPULSION UNIT

CROSS-REFERENCE TO RELATED APPLICATION

This application claims priority under 35 U.S.C. § 119 to French Patent Application No. 1761076, filed Nov. 22, 2017, which is herein incorporated by reference in its entirety.

BACKGROUND

A propulsion unit, especially for an aircraft, comprises, for example, a bypass turbine engine integrated in an external annular case. The turbine engine generally comprises, in the upstream to downstream direction of the gas flow, at least one fan, then a gas generator comprising one or several compressor stages, low pressure then high pressure, a combustion chamber, one or several turbine stages, high pressure then low pressure, and an exhaust nozzle. The turbine engine rotors are rotationally mobile about a longitudinal axis X of the turbine engine.

The air flow driven by the fan is separated into a primary air flow penetrating into a primary duct of the gas generator and a secondary air flow that flows in a secondary duct surrounding the primary duct, the secondary air flow participating predominantly in the thrust supplied by the propulsion unit.

The propulsion unit comprises different elements passing through the secondary duct, namely in general in the upstream to downstream direction:
- a grid of straightening blades better known by the acronym "OGV" for "Outlet Guide Vanes," these OGV blades having the function of straightening the flow of the secondary air flow entering the secondary duct;
- a plurality of structural arms of an intermediate case; and
- at least one passage arm of ancillaries such as air ducts, oil ducts, electric cables, transmission shafts, etc. Such an arm allows to connect a first equipment located radially inside the duct to a second equipment located radially outside the duct while minimizing disturbances of the secondary air flow.

By way of example, a propulsion assembly comprises, for example, forty-eight OGV blades, six structural arms, and two ancillary passage arms.

In order to minimize disturbances of the secondary air flow, an OGV blade, a structural arm, and an ancillaries passage arm are generally aligned longitudinally, in other words said OGV blade, the structural arm, and the ancillaries passage arm present the same angular position.

However, despite the optimized positioning of elements in the secondary duct, the proximity of two longitudinally consecutive arms (OGV blade/structural arm and/or structural arm/ancillaries passage arm) is a source of significant disturbances (potential aerodynamic backflow and wake interactions) in the secondary air flow resulting especially in a strong angular (or azimuthal) distortion of the secondary air flow. In general, these disturbances obviously have a negative incidence on the performances of the propulsion unit.

These disturbances are particularly important as the longitudinal distances between elements are small.

To reduce these disturbances, it is possible to join elements that are longitudinally aligned (for example by adding fairings) in order to form a single arm (hereinafter called pylon) with a continuous external surface.

The dimensioning of such a pylon opens a new direction of development to further optimize the flow of the secondary air flow and the performances of the propulsion unit in general.

The present disclosure aims thus to provide a propulsion unit comprising at least one pylon dimensioned to optimize the secondary air flow and, in general, the performances of the propulsion unit.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Embodiments of the present disclosure concern a propulsion unit having at least one pylon placed in an annular duct delimited radially by an internal case and an external case, said duct surrounding a gas generator, said pylon having a cross-section with a profiled shape relative to a longitudinal direction substantially parallel to an air flow driven by a fan and intended to flow around said pylon in the upstream to downstream direction, said pylon having:
- an upstream blade straightening said air flow, said upstream blade presenting a leading edge, a construction trailing edge and an axial chord $C_x$ connecting said leading edge to said trailing edge;
- a downstream arm;
- a fairing connecting the upstream blade to the downstream arm so as to cover at least said trailing edge of said upstream blade;

wherein:
- the downstream arm has at least one internal structural arm presenting a leading edge;
- the fairing has at least one upstream segment so as to cover at least said leading edge of said structural arm;
- the downstream arm has at least one downstream shell, e.g., for the passage of ancillaries, the downstream shell determining at least one downstream end trailing edge of said downstream arm, the fairing also having a downstream segment connecting said downstream shell to said structural arm.

The pylon may be dimensioned based on the following parameters:
- a first distance D defining a first longitudinal distance between a trailing edge of a blade of said fan and said leading edge of said upstream blade of said pylon, at a level of said internal case;
- a second distance d defining a second longitudinal distance between said trailing edge of said upstream blade of said pylon and said leading edge of said structural arm, at the level of said internal case; and/or
- a third distance L defining a third longitudinal distance between the trailing edge of said upstream blade of said pylon and a mark on said downstream arm located at a maximum thickness of said downstream arm, at the level of said internal case.

The pylon may be dimensioned as follows:
- a first quotient between the first distance D and said axial chord $C_x$ of said upstream blade may be between about 2.2 and about 2.6;
- a second quotient between the second distance d and said axial chord $C_x$ of said upstream blade may be between about 1 and about 1.2; and/or a third quotient between the third distance L and said axial chord Cx of said upstream blade may be between about 4 and about 7.

Such dimensioning of the pylon optimizes the flow of the secondary air flow and generally improves the performance of the propulsion unit. Indeed, such dimensioning enables to significantly homogenise the secondary air flow in the secondary duct, and in other words, significantly reduce the angular (or azimuthal) distortion of the secondary air flow.

The term "construction" is used herein to describe a non-material form of the pylon necessary for its dimensioning.

The propulsion unit according to the present disclosure may include one or several of the following characteristics taken separately from one another or in combination with each other:
- a diameter of said external case at the level of said upstream blade may be between about 935 mm and about 1265 mm and/or a diameter of said internal case at the level of said upstream blade may be between about 595 mm and about 805 mm;
- a quotient between the diameter of said external case at said upstream blade and the diameter of said internal case at said upstream blade may be between about 1.5 and about 1.7;
- a quotient between the first distance D and said axial chord Cx of said upstream blade may be equal to about 2.4;
- a quotient between the second distance d and said axial chord Cx of said upstream blade may be equal to about 1.1;
- a quotient between the third distance L and said axial chord Cx of said upstream blade may be equal to about 5.8;
- a compression ratio corresponding to the quotient between the pressure of said air flow downstream from said upstream blade and the pressure of said air flow upstream from the fan may be between about 1.2 and about 1.9;
- a flow velocity of said air flow downstream from said upstream blade may be between about 0.4 Ma and about 0.95 Ma;
- the structural arm may include an internal trailing edge and the fairing has its downstream segment that connects said downstream shell to said structural arm by covering said internal trailing edge.

DESCRIPTION OF THE DRAWINGS

The foregoing aspects and many of the attendant advantages of the present disclosure will become more readily appreciated as the same become better understood by reference to the following detailed description, when taken in conjunction with the accompanying drawings, wherein.

DETAILED DESCRIPTION

While illustrative embodiments are illustrated and described herein, it will be appreciated that various changes can be made therein without departing from the spirit and scope of the present disclosure.

In the following description, specific details are set forth to provide a thorough understanding of exemplary embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure. Further, it will be appreciated that embodiments of the present disclosure may employ any combination of features described herein.

The present application may also reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. For example, the term "about" may refer to +/−5%.

Figure 1:
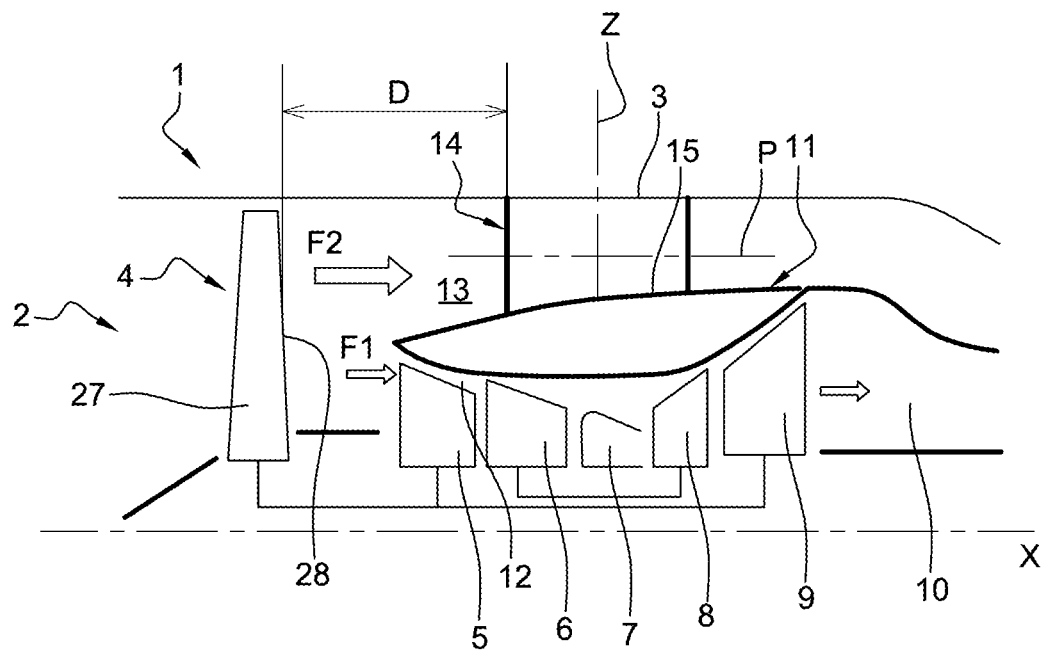
FIG. 1 is a schematic longitudinal cross-sectional view of a propulsion unit comprising a pylon placed in a secondary duct according to the present disclosure.

On FIG. 1 is represented a propulsion unit 1, especially for aircraft, comprising a bypass turbine engine 2 integrated into an annular external case 3. The turbine engine 2 comprises, in the upstream to downstream direction of the gas flow, a fan 4 and a gas generator comprising one or several compressor stages, low pressure 5 then high pressure 6, a combustion chamber 7, one or several turbine stages, high pressure 8 then low pressure 9, and an exhaust nozzle 10.

The rotors of the turbine engine 2 are rotationally mobile about a longitudinal axis X of the turbine engine 2.

By convention in the present application, "longitudinally" or "longitudinal" means any direction parallel to the axis X, and "radially" or "radial" means any direction Z perpendicular to the axis X. Similarly, by convention in the present application, the terms "internal," "external," "inner," or "outer" are defined radially with respect to the axis X. Finally, the terms "upstream" and "downstream" are defined relative to the direction of circulation of gases in the propulsion unit 1.

The air flow driven by the fan 4 is separated by a splitter of an inter-duct structure 11 into a primary air flow F1 penetrating into a primary duct 12 of the gas generator and a secondary air flow that F2 flowing into a secondary duct 13 surrounding the primary duct 12, the secondary air flow F2 participating predominantly in the thrust supplied by the propulsion unit 1.

The propulsion unit 1 comprises at least one pylon 14 placed in the annular secondary duct 13 delimited radially by an annular internal case 15 of the inter-duct structure 11 and the external case 3. the pylon 14 presents in cross-section (plane perpendicular to the Z direction) a profiled shape relative to the longitudinal direction X substantially parallel to the secondary air flow F2 flowing around the pylon 14 in the upstream to downstream direction.

The pylon 14 comprises:
- an upstream blade 16 straightening the secondary air flow F2, the upstream blade 16 presenting a leading edge 17, a construction trailing edge 18 and an axial chord Cx connecting the leading edge 17 to the trailing edge 18 of the upstream blade 16, the chord Cx for example being expressed in metres (m);
- a downstream arm 21 comprising at least one internal structural arm 19 presenting a leading edge 20 and at least one downstream shell 25C for the passage of ancillaries, this downstream shell 25C determining at least one trailing edge 25B of the downstream end of the downstream arm 21;

a fairing 22 connecting the upstream blade 16 to the downstream arm 21 so as to cover at least the trailing edge 18 of the upstream blade 16, the fairing 22 comprising at least one upstream segment 26V so as to cover at least the leading edge 20 of the structural arm 19 and a downstream segment 26R connecting the downstream shell 25C to the structural arm 19.

Figure 2:
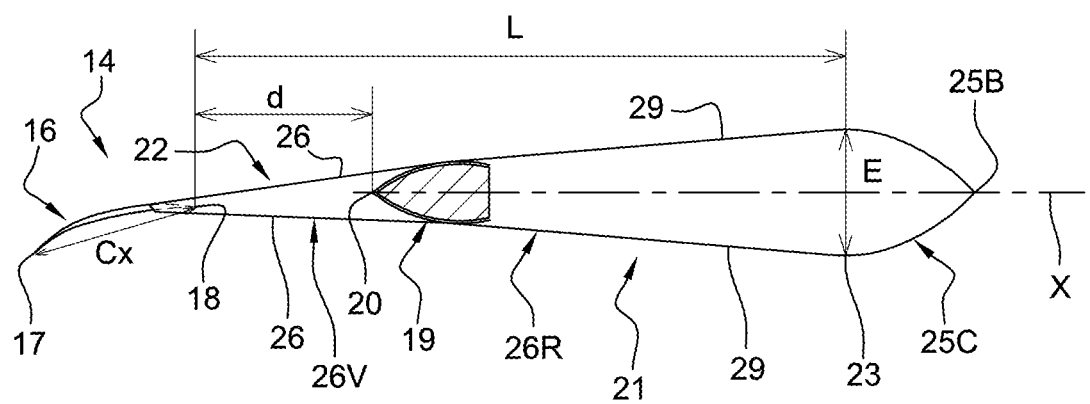
FIG. 2 is a schematic sectional view of the pylon of the propulsion unit, according to a plane P represented in FIG. 1.

The pylon 14 is dimensioned based on the following parameters:

a distance D defining the longitudinal distance between a trailing edge 28 of a blade 27 of the fan 4 and the leading edge 17 of the upstream blade 16 of the pylon 14, at the level of the internal case 15 (represented on FIG. 1);

a distance d defining the longitudinal distance between the trailing edge 18 of the upstream blade 16 of the pylon 14 and the leading edge 20 of the structural arm 19, at the level of the internal case 15 (represented on FIG. 2); and a distance L defining the longitudinal distance between the trailing edge 18 of the upstream blade 16 of the pylon 14 and a mark 23 on the downstream arm 21 located at a maximum thickness of the downstream arm 21, at the level of the internal case 15 (represented on FIG. 2).

The distances D, d and L are, for example, expressed in meters (m).

The pylon 14 is dimensioned as follows:

the quotient between the distance D and the axial chord Cx of the upstream blade 16 is comprised between 2.2 and 2.6, and is advantageously equal to 2.4;

the quotient between the distance d and the axial chord Cx of the upstream blade 16 is comprised between 1 and 1.2, and is advantageously equal to 1.1;

the quotient between the distance L and the axial chord Cx of the upstream blade 16 is comprised between 4 and 7, and is advantageously equal to 5.8.

According to the embodiments illustrated in the figures, the propulsion unit 1 comprises a first pylon 14 located at 12 o'clock in the secondary duct 13 by analogy to clock dial and a second pylon 14 located at 6 o'clock (not represented in FIG. 1).

According to the embodiments illustrated in the figures, the upstream straightening blade 16 of the pylon 14 radially crosses the secondary duct 13 and is of a constant profile according to an extension direction Z (substantially radial and perpendicular to the longitudinal direction X). The upstream blade 16 presents, in cross-section along a plane P perpendicular to the extension direction Z, a curved (or cambered) profile configured to straighten the secondary air flow F2 penetrating into the secondary duct 13. The upstream blade 16 furthermore has a lateral intrados face and a lateral extrados face opposite to the lateral intrados face, the intrados and extrados faces connecting the leading edge 17 to the construction trailing edge 18. In a cross-section according to the plane P, the thickness of the upstream blade 16 increases from the leading edge 17 until reaching the connection between the upstream blade 16 and the upstream segment 26V of the fairing 22.

Figure 3:
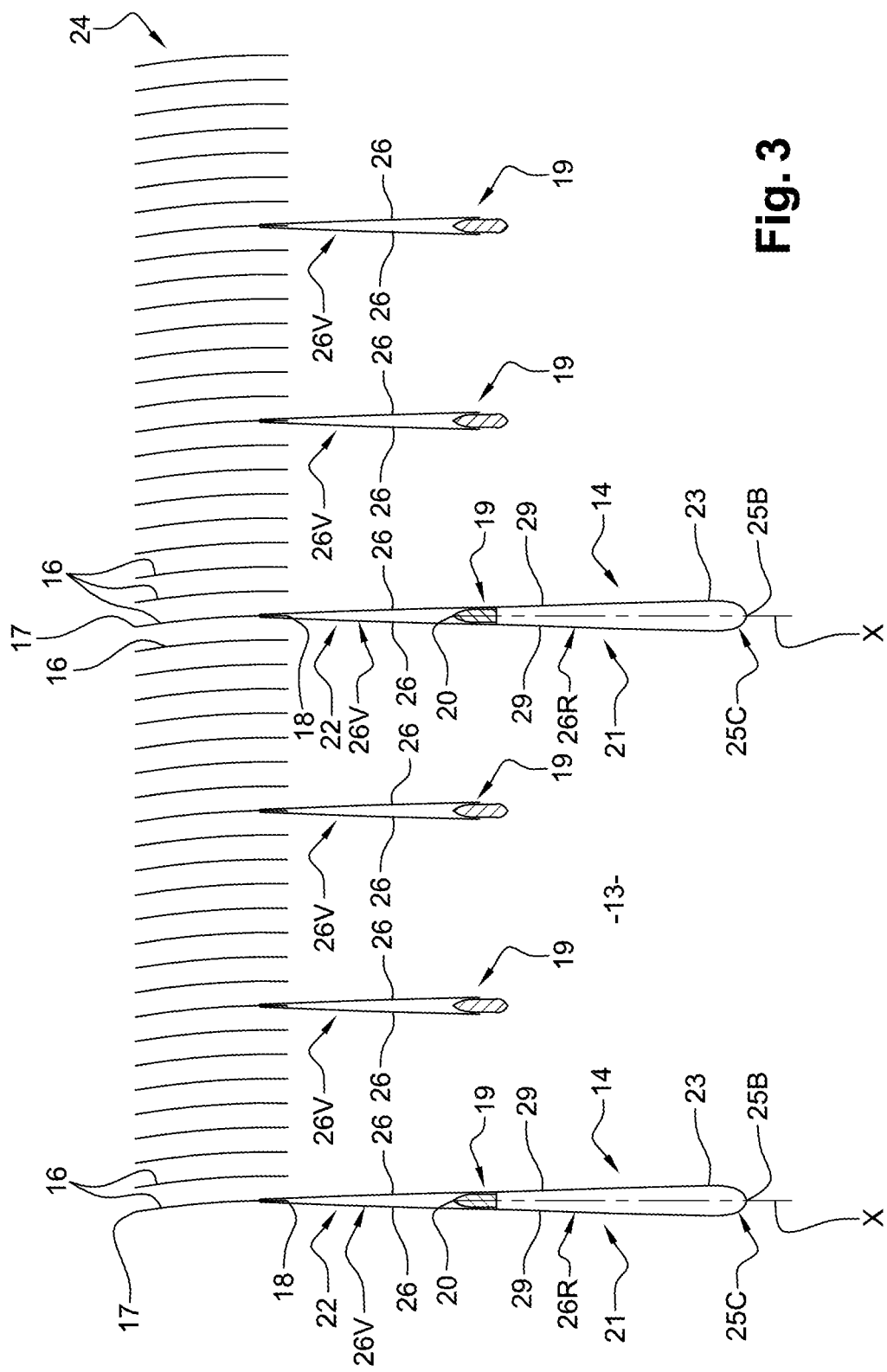
FIG. 3 is a schematic flattened three hundred and sixty-degree view of the secondary duct.

As illustrated in FIG. 3, the upstream blade 16 is bordered on either side according to a circumferential direction, by straightening blades 16 called OGV (for "Outlet Guide Vanes") of a grid 24 arranged upstream in the secondary duct 13. The upstream blade 16 is fixed outside a fan case of the external case 3 and inside the internal case 15 close to the splitter of the primary and secondary ducts 12, 13. The propulsion unit 1 comprises forty-eight straightening blades 16, of which two form an integral part of the two pylons 14.

The structural arm 19 of the pylon 14 also radially crosses the secondary duct 13 and has a constant profile according to the extension direction Z. The structural arm 19 presents, in cross-section according to the plane P, an ogive profile (symmetric profile), whose tip is oriented upstream. The structural arm 19 is here represented full to facilitate the reading of the figure, but it could be tubular. The structural arm 19, as represented schematically in the example in FIG. 2, is preferably hollow for a question of mass and there is also linkage that passes inside it in this case. The structural arm 19 is configured to withstand the principal forces and thus to form the frame on which different elements such as the fan 4 are fixed. The structural arm 19 is fixed externally to an external shell of the external case 3 and internally to an internal hub of the internal case 15.

As illustrated in FIG. 3, the structural arm 19 is bordered on either side according to a circumferential direction by two other structural arms 19 that are also fixed to the external shell and the internal hub. More commonly, the assembly comprising the external shell, the structural arms 19 and the internal hub is called the "intermediate case". The propulsion unit 1 comprises six structural arms 19, two of which form an integral part of the two pylons 14.

The downstream ancillaries passage arm 21 also radially crosses the secondary duct 13 and has a constant profile according to the extension direction Z. The downstream arm 21 presents, in cross-section according to the plane P, a symmetrical profile delimited upstream by the structural arm 19 and downstream by the downstream shell 25C. In a cross-section according to the plane P, the thickness of the downstream arm 21 increases from the structural arm 19 up to a maximum thickness E (mark 23 necessary to determine L), which in this case is at the boundary between the downstream segment 26R of the fairing 22 and the downstream shell 25C, then decreasing to the trailing edge 25B of the downstream shell 25C. Such a profile enables especially to limit the pressure losses especially by preventing the creation of recirculation zones.

The downstream shell 25C of the downstream arm 21 is tubular to enable the passage of ancillaries such as air ducts, oil ducts, electrical cables, etc. Such a downstream shell 25C enables to connect a first equipment located radially inside the secondary duct 13 (at the level of the internal case 15 of the inter-duct structure 11) to a second equipment located radially external to the secondary duct 13 (at the level of the external case 3) while minimising disturbances to the secondary air flow F2. The downstream arm 21 is fixed externally to the external case 3 (and more precisely on a portion of the external case 3 known under the acronym OFD for "Outer Fan Duct") and internally to the internal case 15 (and more precisely to a portion of the internal case 15 known under the acronym IFD for "Inner Fan Duct").

As illustrated in FIG. 3, the propulsion unit 1 comprises here two downstream arms 21, namely a first downstream arm 21 located at 12 o'clock in the secondary duct 13 by analogy to a clock dial and a second downstream arm 21 located at 6 o'clock, these two downstream arms 21 form an integral part of the two pylons 14.

As illustrated in the figures, the upstream segment 26V of the fairing 22 comprises two plates 26 located on either side of the pylon 14, each of the plates 26 connecting the upstream blade 16 to the structural arm 19. In a cross-section according to the plane P, the thickness defined between the two plates 26 increases from the upstream blade 16/upstream segment 26V connection until it reaches the structural arm 19/upstream segment 26V connection. Each plate 26 comprises an upstream end and a downstream end respectively bearing on the upstream blade 16 and the structural arm 19. The upstream and downstream ends of each plate 26 are respectively fixed to the upstream blade 16 and to the structural arm 19 via appropriate attachment means, such as screws and/or nuts and/or rivets, etc. . . .

Advantageously, the upstream and downstream ends of the plate 26 are respectively tangent to the external profile of the upstream blade 16 and to the structural arm 19 so as to limit pressure losses.

As illustrated in the figures, the downstream segment 26R of the fairing 22 comprises two plates 29 located on either side of the pylon 14, each of the plates 29 connecting the structural arm 19 to the downstream shell 25C. In a cross-section according to the plane P, the thickness defined between two plates 29 increases from the structural arm 19/downstream segment 26R connection until it reaches the downstream shell 25C/downstream segment 26R connection. Each plate 29 comprises an upstream end and a downstream end respectively bearing on the structural arm 19 and the downstream shell 25C. The upstream and downstream ends of each plate 29 are respectively fixed to the structural arm 19 and to the downstream shell 25C via appropriate attachment means, such as screws and/or nuts and/or rivets, etc.

The external surface of all the different components, namely the upstream blade 16, the plates 26 (or upstream segment 26V), the structural arm 19, the plates 29 (or downstream segment 26R), and the downstream shell 25C, form a continuous aerodynamic surface of the pylon 14.

Advantageously, as illustrated in FIG. 3, the propulsion unit 1 comprises an upstream segment 26V of the fairing 22 between a straightening blade 16 and a structural arm 19 when the latter are longitudinally aligned, in the same way as the pylon 14. The straightening blade 16 and the structural arm 19 are positioned in the secondary duct 13 according to the dimensioning rules announced for the pylon 14.

In an embodiment, the diameter of the external case 3 at level of the upstream blade 16 of the pylon 14 is comprised between 935 mm (millimetres) and 1265 mm and/or the diameter of the internal case 15 at the level of the upstream blade 16 of the pylon 14 is between 595 mm and 805 mm.

In an embodiment, the quotient between the diameter of the external case 3 at the level of the upstream blade 16 and the diameter of the internal case 15 at the level of the upstream blade 16 is between 1.5 and 1.7.

In an embodiment, the compression ratio corresponding to the quotient between the pressure of the secondary air flow F2 downstream from said upstream blade 16 of the pylon 14 and the pressure of the secondary air flow F2 upstream from the fan 4 is between 1.2 and 1.9.

In an embodiment, the flow velocity of the secondary air flow F2 downstream from the upstream blade 16 is between 0.4 Ma (Mach) and 0.95 Ma.

Figure 4:
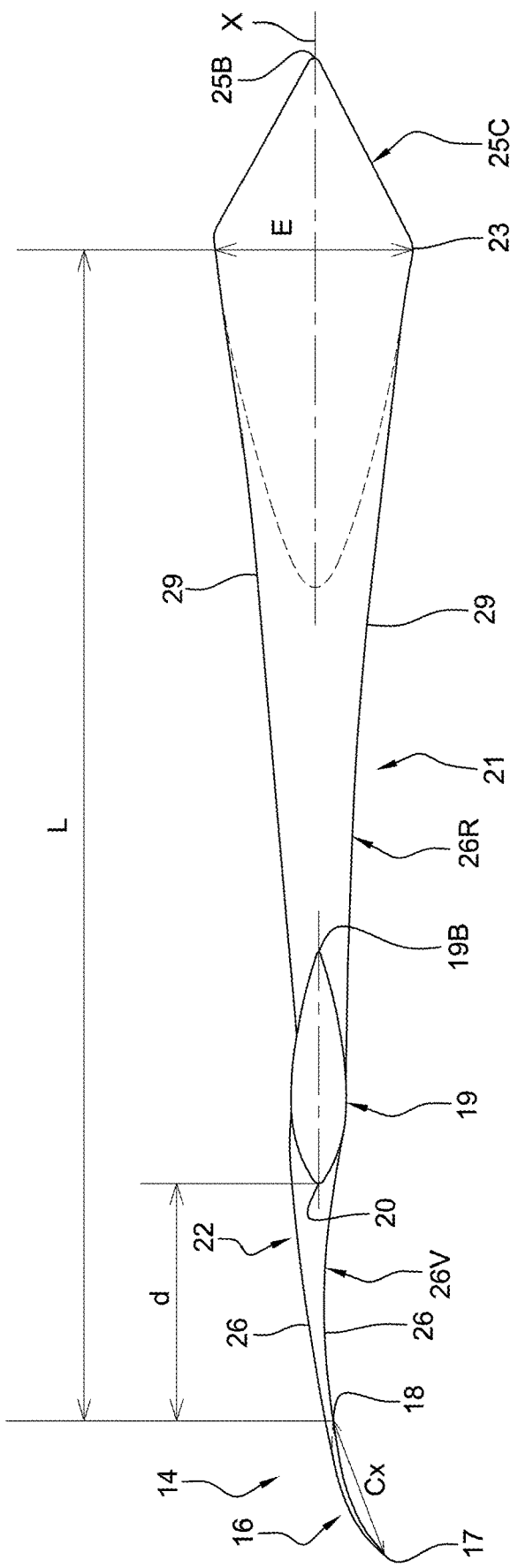
FIG. 4 is a sectional view of a pylon according to an alternative embodiment.

According to the alternative embodiment illustrated in FIG. 4, the structural arm 19 comprises an internal trailing edge 19B, and the fairing 22 has its downstream segment 26R that connects the downstream shell 25C to the structural arm 19 by covering the internal trailing edge 19B. The cross-section of the structural arm 19 according to the plane P presents a symmetric biconvex profile.

In FIG. 4, the half-profile in dashed lines upstream from the downstream shell 25C is used for the construction of the pylon 14, and the half-profile is non-material. As an alternative, this half-profile could be an upstream shell (material) forming a tubular element with the downstream shell 25C.

The flattened three hundred and sixty-degree view of the secondary duct (FIG. 3) may be incorporated with the alternative embodiment illustrated in FIG. 4.

In the embodiment of FIG. 4, the structural arms 19 may be identical for all blades, regardless of whether they are isolated or associated with the downstream arm.

The embodiments illustrated in the figures are in no way limiting. The shape of the different components (upstream blade 16, plate 26; structural arm 19, plate 29, downstream shell 25C) of the pylon 14 could be different. Each component could be made of the same material as a neighboring component, or on the contrary, dissociated in several elements.

The embodiments of the invention in which an exclusive property or privilege is claimed are defined as follows:

1. A propulsion unit comprising:
   a pylon disposed in an annular duct delimited radially by an internal case and an external case, said annular duct surrounding a gas generator, said pylon having a cross-section with a profiled shape relative to a longitudinal direction substantially parallel to an air flow driven by a fan, said pylon comprising:
   an upstream blade configured to straighten said air flow, said upstream blade presenting a leading edge, a first trailing edge, and an axial chord Cx connecting said leading edge to said first trailing edge;
   a downstream arm; and
   a fairing connecting the upstream blade to the downstream arm to cover at least said first trailing edge of said upstream blade;
   wherein:
   the downstream arm comprises at least one internal structural arm presenting a leading edge;
   the fairing comprises at least one upstream segment covering at least said leading edge of said structural arm; and
   the downstream arm comprises at least one downstream shell, the downstream shell determining at least one downstream end trailing edge of said downstream arm, the fairing also comprising a downstream segment connecting said downstream shell to said structural arm;
   wherein the pylon is dimensioned as follows:
   a first distance D defining a first longitudinal distance between a second trailing edge of a blade of said fan and said leading edge of said upstream blade of said pylon, at a level of said internal case;
   a second distance d defining a second longitudinal distance between said first trailing edge of said upstream blade of said pylon and said leading edge of said structural arm, at the level of said internal case; and
   a third distance L defining a third longitudinal distance between the first trailing edge of said upstream blade of said pylon and a mark on said downstream arm located at a maximum thickness of said downstream arm, at the level of said internal case;
   wherein the pylon is dimensioned as follows:
   a first quotient between the first distance D and said axial chord Cx of said upstream blade is between 2.2 and 2.6, inclusive;
   a second quotient between the second distance d and said axial chord Cx of said upstream blade is between 1 and 1.2, inclusive;

a third quotient between the third distance L and said axial chord Cx of said upstream blade is between 4 and 7, inclusive.

2. The propulsion unit of claim 1, wherein a diameter of said external case at said upstream blade is between 935 mm and 1265 mm, inclusive.

3. The propulsion unit of claim 1, wherein the quotient between a diameter of said external case at the level of said upstream blade and a diameter of said internal case at the level of said upstream blade is between 1.5 and 1.7.

4. The propulsion unit according to claim 1, wherein the first quotient is 2.4.

5. The propulsion unit according to claim 1, wherein the second quotient is 1.1.

6. The propulsion unit according to claim 1, wherein the third quotient is 5.8.

7. The propulsion unit according to claim 1, wherein a compression ratio corresponding to a fourth quotient between a downstream pressure of said air flow downstream from said upstream blade and an upstream pressure of said air flow upstream from the fan is between 1.2 and 1.9.

8. The propulsion unit according to claim 1, wherein a flow velocity of said air flow downstream from said upstream blade is between 0.4 Ma and 0.95 Ma.

9. A propulsion unit according to claim 1, wherein the structural arm comprises an internal trailing edge and the downstream segment of the fairing connects said downstream shell to said structural arm by covering said internal trailing edge.

10. The propulsion unit of claim 1, wherein a diameter of said internal case at said upstream blade is between 595 mm and 805 mm, inclusive.

11. The propulsion unit of claim 10, wherein a diameter of said external case at said upstream blade is between 935 mm and 1265 mm, inclusive.

* * * * *